United States Patent
Koch et al.

(10) Patent No.: US 11,304,026 B2
(45) Date of Patent: Apr. 12, 2022

(54) ASSISTED MICRO-ENVIRONMENT INTERACTION

(71) Applicant: AT&T Intellectual Property I, L.P., Atlanta, GA (US)

(72) Inventors: Robert Koch, Peachtree Corners, GA (US); Nikhil Marathe, Palatine, IL (US); James Pratt, Round Rock, TX (US); Ari Craine, Marietta, GA (US); Eric Zavesky, Austin, TX (US); Timothy Innes, Atlanta, GA (US); Nigel Bradley, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/709,680

(22) Filed: Dec. 10, 2019

(65) Prior Publication Data

US 2021/0176589 A1    Jun. 10, 2021

(51) Int. Cl.
*H04W 24/00* (2009.01)
*H04W 4/021* (2018.01)
*H04W 4/02* (2018.01)
*G06F 16/2457* (2019.01)

(52) U.S. Cl.
CPC ...... *H04W 4/021* (2013.01); *G06F 16/24575* (2019.01); *H04W 4/023* (2013.01)

(58) Field of Classification Search
CPC ....... H04L 29/08657; H04L 29/08936; H04W 4/02; H04W 4/024; H04W 4/029; H04W 64/00; H04W 4/00; H04W 4/08; H04W 4/021; G01C 21/3614; G01C 21/3617; G01C 21/362; G01C 21/3626
See application file for complete search history.

(56) References Cited

U.S. PATENT DOCUMENTS

| | | | |
|---|---|---|---|
| 6,867,733 B2 | 3/2005 | Sandhu et al. | |
| 7,418,268 B1 | 8/2008 | Cabano et al. | |
| 7,686,217 B2 | 3/2010 | Heckel et al. | |
| 7,847,684 B1 | 12/2010 | Brady, Jr. | |
| 8,010,131 B2 * | 8/2011 | Rothschild | H04W 76/10 455/456.3 |
| 8,108,414 B2 | 1/2012 | Stackpole | |
| 8,655,385 B2 | 2/2014 | Li | |
| 8,688,143 B2 | 4/2014 | Steenstra et al. | |
| 8,892,130 B2 | 11/2014 | Hudson et al. | |

(Continued)

FOREIGN PATENT DOCUMENTS

WO    WO 2018/124931 A1    7/2018

OTHER PUBLICATIONS

Ference et al.; "Location Recommendation for Out-of-Town Users in Location-Based Social Networks"; Proceedings of the 22$^{nd}$ ACM Int'l Conf. on Information & Knowledge Management; 2013; p. 721-726.

(Continued)

*Primary Examiner* — Shantell L Heiber
(74) *Attorney, Agent, or Firm* — Guntin & Gust, PLC; Kenneth Kwan (57) ABSTRACT

Methods, systems, and apparatuses may provide for the auto-determination of collective commonalities among users located within an environment. Once determined, a number of features may be further described for management of interactions within the environment.

20 Claims, 4 Drawing Sheets

(56) References Cited

U.S. PATENT DOCUMENTS

| | | | |
|---|---|---|---|
| 9,173,245 B2 | 10/2015 | Bill | |
| 9,203,857 B2 | 12/2015 | Niccolini et al. | |
| 9,226,105 B2 | 12/2015 | Turgman et al. | |
| 9,268,920 B1 * | 2/2016 | Butler | G06F 21/10 |
| 9,357,352 B1 | 5/2016 | Alharayeri | |
| 9,485,211 B2 | 11/2016 | Rao | |
| 9,830,562 B1 | 11/2017 | Mason, Jr. et al. | |
| 9,940,402 B2 | 4/2018 | Lento et al. | |
| 10,013,489 B2 * | 7/2018 | Jones | G06F 16/951 |
| 10,049,400 B2 | 8/2018 | Caralis et al. | |
| 10,075,822 B2 * | 9/2018 | Rajendran | H04L 61/609 |
| 10,078,696 B1 | 9/2018 | Sadler | |
| 10,264,609 B2 | 4/2019 | Aneja et al. | |
| 10,575,138 B1 * | 2/2020 | Klinkner | G08B 21/24 |
| 10,599,390 B1 * | 3/2020 | Brahmbhatt | G06F 3/165 |
| 2004/0116106 A1 * | 6/2004 | Shishido | H04L 29/06 |
| | | | 455/414.2 |
| 2010/0313142 A1 | 12/2010 | Brown | |
| 2013/0316735 A1 | 11/2013 | Li et al. | |
| 2013/0331087 A1 * | 12/2013 | Shoemaker | H04W 4/029 |
| | | | 455/420 |
| 2014/0162698 A1 | 6/2014 | Han | |
| 2015/0058427 A1 | 2/2015 | Grignon | |
| 2015/0080027 A1 | 3/2015 | Amrhein et al. | |
| 2015/0088672 A1 * | 3/2015 | Song | G06F 3/04842 |
| | | | 705/15 |
| 2015/0365787 A1 * | 12/2015 | Farrell | H04W 4/029 |
| | | | 455/456.1 |
| 2015/0378587 A1 * | 12/2015 | Falaki | H04L 67/02 |
| | | | 715/747 |
| 2016/0261985 A1 | 9/2016 | Surve | |
| 2016/0334545 A1 * | 11/2016 | Varelas | G01W 1/02 |
| 2016/0364811 A1 * | 12/2016 | Chen | H04L 67/16 |
| 2018/0176166 A1 * | 6/2018 | Philipson | G06F 3/04817 |
| 2019/0014220 A1 * | 1/2019 | Fogelson | H04M 19/04 |
| 2019/0215660 A1 * | 7/2019 | Slushtz | G01S 19/19 |
| 2021/0173880 A1 * | 6/2021 | Cooper | G06F 16/954 |

OTHER PUBLICATIONS

Brown et al.; "Where Online Friends Meet: Social Communities in Location-based Networks"; 6$^{th}$ Annual Conf. on Weblogs and Social Media; 2012; 4 pages.

Bao et al.; "Location-based and Preference-Aware Recommendation Using Sparse Geo-Social Networking Data"; Proceedings of the 20$^{th}$ ACM Int'l Conf. on advances in geographic information system; 2012; 10 pages.

Wang et al.; "Discovering and Profiling Overlapping Communities in Location-Based Social Networks"; IEEE Transactions on Systems, Man, and Cybernetics: Systems; vol. 44; Apr. 2014; p. 499-509.

* cited by examiner

ASSISTED MICRO-ENVIRONMENT INTERACTION

BACKGROUND

Various technologies exist for determining the location of a wireless device. Various localization services are known that determine the location of a user based on the calculation of the location of their wireless device. Some localization technologies are directed at determining the presence of a device or user within a virtual perimeter of a given geographical landscape. The virtual boundaries of the virtual perimeter can be used for various applications such as asset management and tracking, automatic house arrest monitoring systems, and location based targeted advertising. Yet the adaptability of such virtual perimeters may be improved. This disclosure is directed to addressing issues in the existing technology.

This background information is provided to reveal information believed by the applicant to be of possible relevance. No admission is necessarily intended, nor should be construed, that any of the preceding information constitutes prior art.

SUMMARY

Disclosed herein are methods, systems, and apparatuses that provide for the auto-determination of the collective commonalities among users located within an environment. Once determined, a number of features may be further described for management of interactions within the environment.

In an example, an apparatus may include a processor and a memory coupled with the processor that effectuates operations. The operations may include detecting a first mobile device in proximity to a first environment; based on the detecting of the first mobile device in proximity to the first environment, obtaining a profile associated with the first mobile device; based on the profile associated with the first mobile device, obtaining first user information associated with a first user of the mobile device; comparing the first user information associated with the first user of the first mobile device with respective user information associated with each of a plurality of users of mobile devices; based on the comparing, determining a threshold confidence level is reached; and based on reaching the threshold confidence level, managing one or more interactions associated with a micro-environment of the first environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

This disclosure describes the auto-determination of the commonalities among users (or devices) located within an environment. Once determined, a number of features may be further described for management of interactions within the environment—for a person entering the environment, a person who is an environment manager, or a virtual environment manager.

Figure 1:
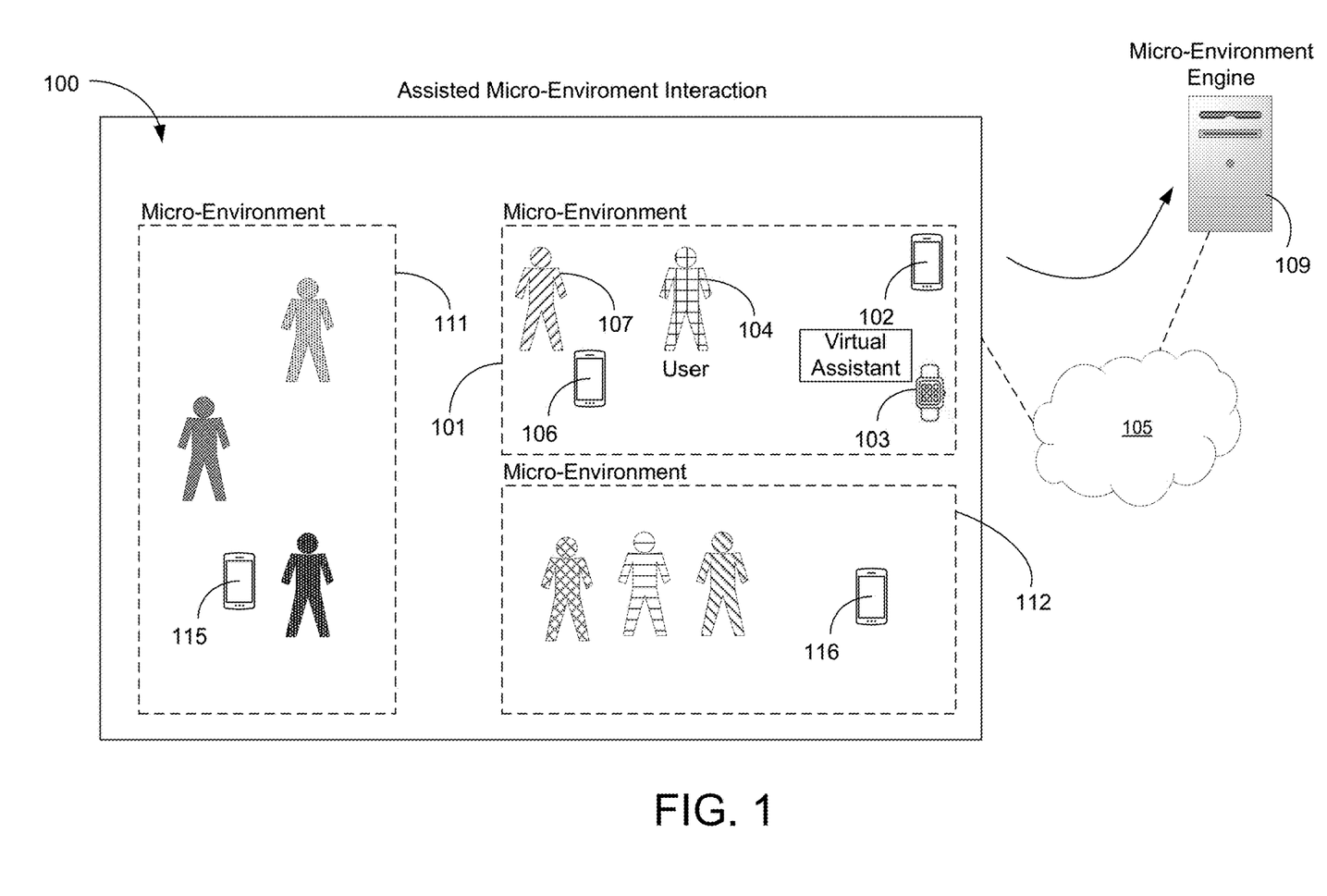
FIG. 1 illustrates an exemplary system associated with assisted micro-environment interaction.

FIG. 1 illustrates an exemplary system associated with assisted micro-environment interaction. Environment 100 may include a plurality of devices of one or more users that may be associated with one or more micro-environments, such as micro-environment 101, micro-environment 111, or micro-environment 112. In an example, environment 100 may be a home, a store, a campus, a restaurant, a concert venue, or any number of other inside or outside venues in which a person, thing (e.g., robot or autonomous vehicle), or animal (e.g., dog or cat) may congregate. As disclosed in more detail herein, a micro-environment may be considered a cluster of devices (or users) within an environment.

As shown, micro-environment 101 may include mobile device 102 and mobile device 103 associated with user 104 and mobile device 106 associated with user 107. Other mobile devices, such as mobile device 115 or mobile device 116 may be associated with other users of other micro-environments, such as micro-environment 111 or micro-environment 112. Mobile device 102, mobile device 103, mobile device 115, or mobile device 116 may be communicatively connected with micro-environment engine (MEE) 109 via network 105. MEE 109 may be a server that is used to create or otherwise adjust a virtual boundary of micro-environments, send messages to mobile devices in or near micro-environments, or control devices to a adjust the physical environment of micro-environments (e.g., adjust thermostat), among other things. Mobile device 102, mobile device 103, mobile device 115, or mobile device 116 may include, wireless devices, such as satellite communication systems, portable digital assistants (PDAs), laptop computers, tablet devices, smart phones, smart watches, smart speakers, automobiles (e.g., autonomous vehicles), augmented reality devices, implantable devices, virtual reality devices, sensors, or the like. A sensor may include an environmental sensor, acoustic sensor, sound sensor, vibration sensor, fluid sensor, optical sensor, position sensor (e.g., accelerometer or gyroscope), speed sensor, chemical sensor, pressure sensor, camera, or the like. A sensor may be substantially integrated into an object (e.g., mobile device 115) or may be a stand-alone device.

Figure 2:
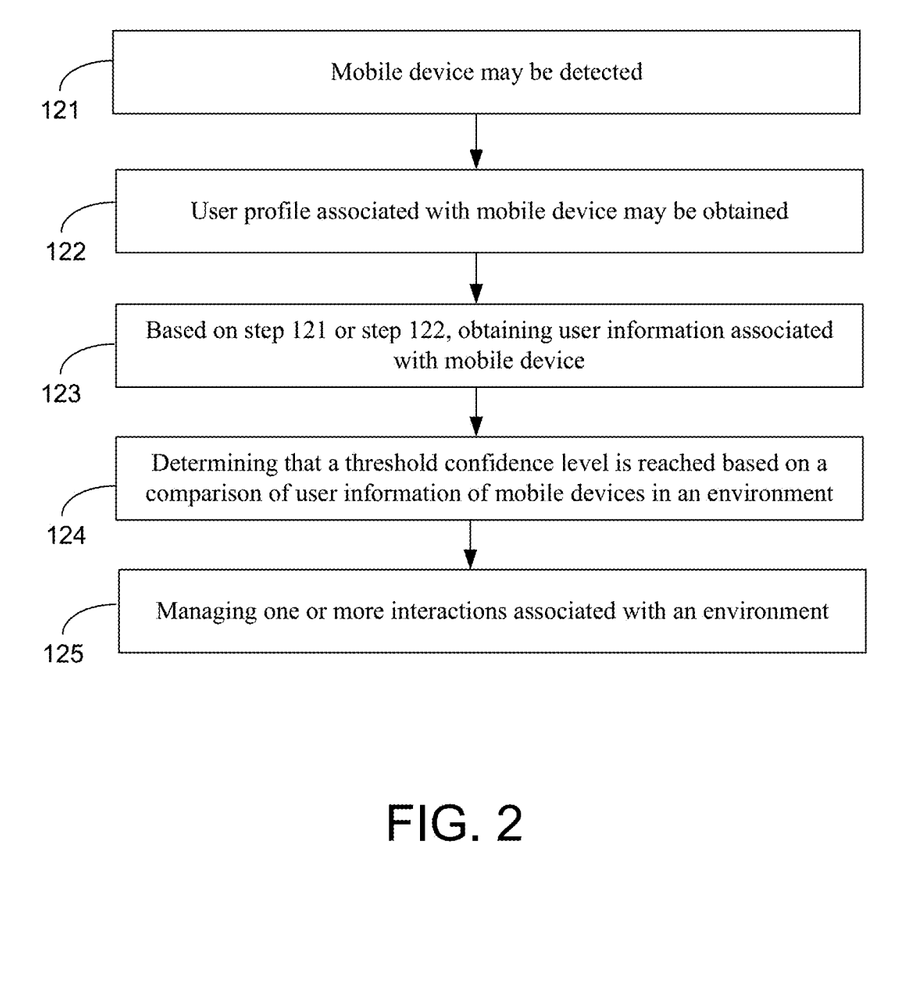
FIG. 2 illustrates an exemplary method associated with assisted micro-environment interaction.

FIG. 2 illustrates an exemplary method associated with assisted micro-environment interaction. A user 107 with mobile device 106 may enter a physical environment, such as environment 100. At step 121, mobile device 106 (e.g., a smart phone) may be detected in environment 100. Mobile device 106 may incorporate a virtual assistant that communicates with a user via a speech interface or visual interface. At step 122, responsive to detecting mobile device 106 in environment 100 (e.g., detecting mobile device at a GPS location), a profile associated with mobile device 106 (which may include information associated with user 107) may be obtained.

At step 123, based on step 121 or step 122 (e.g., location and profile), obtaining user information, such as sensor information from mobile device 106 or other user information associated with mobile device 106. The user information may be obtained from MEE 109 or another device and may relate to the user or the device of the user. The user information may include data such as the device name, device type, device serial number, device manufacture data, warranty expiration date, price paid, device product photo, manufacturer name, user name, user demographics (e.g., age, gender, marital status, occupation, college, etc.), user social media information, date of device manufacture, date of first use of device in service at any location, date of first use of service at a particular location, geographical coordinate position, position of device in or around a facility (e.g., home or business facility), general time of use of device, time of use with different device applications, device features, user tag (e.g., updated info describing an affiliated group of the user, such as attendee of a conference or a birthday party, or employee of an organization), or other data. The sensor information associated with users or mobile devices may include location information, audio (e.g., language, music, or other sound), or temperature, among other things.

At step 124, determining that a threshold confidence level is reached based on a comparison of mobile devices, users, or micro-environments of environment 100 to user information of mobile device 106 (or the associated user 107). The confidence level may be considered a value associated with a commonality (or other measure) of one or more characteristics of a user (or mobile device). This confidence level of mobile device 106 for a characteristic (e.g., user information) may be compared to threshold confidence level that correspond to a characteristic of micro-environment 101.

The determining of step 124 may include comparing user information associated with mobile device 106 with user information of other mobile devices in environment 100 (e.g., mobile device 115, mobile device 116, mobile device 102, or mobile device 103, etc.). In an example, the determining of the threshold confidence level may be based on a comparison of the detected audio of user 107 and the detected audio of user 104. In this case, user 107 and user 104 may speak the same or similar language and therefore MEE 109 may determine that a threshold confidence level has been reached. In another example, the determining of the threshold confidence level may be based on a preferred ambient temperature (or noise level, brightness level, etc.) for user 107 or user 104. In this case, user 107 and user 104 may have the same or similar ambient temperature preference and therefore MEE 109 may determine that the threshold confidence level has been reached. In another example, the determining of the threshold confidence level may be based on an indicated alma mater of user 107 or user 104. In this case, user 107 and user 104 may have attended the same school, attended sister schools, or attended nearby schools and therefore MEE 109 may determine that the threshold confidence level has been reached.

It is contemplated herein that there may be a combination of different user information data to determine a confidence level associated with mobile device 106 or associated confidence level thresholds of a micro-environment. For example the values of the confidence levels across different categories of user information may be an average (the average may be weighted), which may be based on predetermined threshold values or the like. The threshold confidence level, as provided in more detail herein, may help indicate which micro-environment a mobile device (or associated user) should be located in, among other things.

At step 125, based on reaching the threshold confidence level, managing one or more interactions associated with an environment. The managing may include sending alerts for display on mobile device 106 or other devices, altering virtual boundaries (e.g., creating, deleting, or updating micro-environment 101), assigning micro-environments to devices (or users), manipulating devices associated with an environment (e.g., devices associated with climate control or music), or sending instructions to indicate devices (or users) should proceed to a particular micro-environment, among other things.

With continued reference to step 125, in an example, the managing of the one or more interactions may be to send an alert to mobile device 106 for display. The displayed alert may include text or graphics that indicate the boundaries of micro-environment 101 within environment 100. Further, based on the compared user information, each micro-environment may be provided a rank that is displayed on a device. In addition, the position of mobile device 106, mobile device 102, or mobile device 103 may also be displayed. In another example, the managing of the one or more interactions may include MEE 109 sending instructions that mobile device 106 (or user 106) should move to micro-environment 101. MEE 109 may send instructions to mobile device 106 to play audio, display text/graphics, or vibrate to indicate that mobile device 106 is assigned to or located within micro-environment 101. The management of interactions may be used for scenarios such as directing users to reserved group seating (or other space) at a venue or dynamically and automatically manage interactions at a same or similar venue (e.g., restaurant chain) during a subsequent visit. Further, alerts or messages may be sent to wait staff, salespersons, or service providers to assist customers based on settings of micro-environment 101.

It is contemplated herein that the movement of users may be directed by using something other than a mobile device. For example, a camera viewing environment 100 may detect user 107 and a remote display (e.g., computer monitor) may indicate to the user the location of the micro-environment. It is also contemplated that steps herein may be based on user detection or device detection.

Disclosed in more detail below are additional aspects and further considerations associated with assisted micro-environment interaction. The location of mobile device 106 may be shared and registered in MEE 109 (which may also be referred herein as an assisted micro-environment system). MEE 109 may detect whether other users are in proximity of an environment (e.g., 100 feet or less), based on their previously-registered location data. Based on an analysis of participating mobile devices, MEE 109 may create virtual physical boundaries of clusters, in which the clusters include mobile devices. These may be considered micro-environments. Each mobile device may be assigned to one or more micro-environments based on user information (e.g., location, etc.). MEE 109 may continually monitor movements within micro-environment 101 and may modify virtual boundaries of micro-environment 101, or add or delete micro-environment 101. Mobile devices may periodically send user information updates to MEE 109, which may trigger updates associated with micro-environment 101. As the number of users increases or decreases, the boundaries of the micro-environment 101 may change. Therefore, a user that may start in micro-environment 101 at time t0 may be moved to micro-environment 111 at time t1 based on an increase of users with the identified user information to include the threshold value for the particular micro-environment.

MEE 109 may make determinations about various characteristics of each micro-environment. This may be done in a number of ways. Each mobile device may share user information with MEE 109, such as personal preferences, personality information, social networking information, real-time biometric data, or the like. In an example, real-time biometric data may be shared to predict a mood of user 107. Other real-time user information can be shared, such as keywords or topics being discussed, line-of-sight data, or other data that is indicative of how user 107 is behaving within environment 100 or micro-environment 101.

Based on user information that may include mobile device profiles, current user behavior, or the like, MEE 109 may determine common profile or common behavior characteristics among some or all of the members of micro-environment 101. For instance, environment 100 may be a restaurant and MEE 109 may determine that users at a common table (e.g., indicated as micro-environment 101) are all students at the same college and are all Spanish speakers. There language may be determined by, for instance, profile information or their virtual assistants detecting that Spanish is being spoken and notifying MEE 109 of such. The assisted micro-environment system may take the data describing the members and compare it with data describing available wait staff at the restaurant. For instance, a Spanish-speaking waiter who also attended the same school may be assigned to the table (e.g., micro-environment 101). It is contemplated that functions of MEE 109 (e.g., assisted micro-environment system) may be implemented on one or more devices (e.g., a micro-environment control application on mobile device 106).

The assisted micro-environment system may interact directly with the user or the user's virtual assistant to assist the user in how they interact within a micro-environment. The assisted micro-environment system may detect that micro-environment 111 would be preferred for user 107. This determination may use the user information already disclosed (e.g., environmental sensors, which may detect factors like noise level, temperature, light level, or other factors) to determine the makeup of the members of micro-environment 111. The assisted micro-environment system may send an alert to mobile device 106 suggesting that user 107 move from micro-environment 101 to micro-environment 111, which may be a quieter section in the environment of a concert. This alert may also involve an upsell offer that user 107 may pay for.

The assisted micro-environment system may send data to the virtual assistant associated with mobile device 106 that the virtual assistant may use to make recommendations to user 107. An example recommendation may be how to act, what topics to avoid, etc. based on the makeup of micro-environment 101 in which user 107 has entered.

The assisted micro-environment system may detect a collective agreement among the members of micro-environment 101 and adjust micro-environment 101 itself. For example, a plurality of members of micro-environment 101 may be shivering, as detected by implanted biosensors, a detection of multiple members say they are "cold," or other information. The assisted micro-environment system may send a request to an environmental control unit to adjust the temperature. In another example, to accommodate a noise preference for the users of micro-environment 101, the assisted micro-environment system may send a request for a noise cancellation device to activate or for a white noise speaker to turn on or adjust its volume.

In a retail store or other environment, the assisted micro-environment system may detect that members of micro-environment 101 share an interest in buying a new lawn mower. The assisted micro-environment system may instruct a video display to present a demonstration video or advertisement for lawn mowers. The assisted micro-environment system may determine threshold level of commonalities to determine video or other interactions.

A virtual map of environment 100 or micro-environment 101 may be visually displayed. The assisted micro-environment system may suggest (e.g., an alert through a virtual assistant) to user 107 where to go within environment 100 before entering it. User 107 may post on social media the micro-environment user 107 is located in.

As disclosed herein a micro-environment for a mobile device 106 or the associated user 107 may be based on user information. The determined micro-environment 101 may include comparing user information associated with mobile device 106 with user information of other mobile devices in environment 100 (e.g., mobile device 115, mobile device 116, mobile device 102, or mobile device 103, etc.), and general information (e.g., type of environment or another characteristic) about the environment 100. In an example, the determining of the micro-environment may be based on a comparison of the detected audio, a preferred ambient temperature (or noise level, brightness level, etc.), alma maters of users, type of environment (restaurant, sports venue, park, roadway, etc.), or type of mobile device (e.g., smartwatch, autonomous or semi-autonomous vehicle, or unmanned aerial vehicle).

It is contemplated herein that there may be a combination of different user information to reach a threshold confidence level that may help indicate which micro-environment a mobile device (or associated user) should be located in. It is also contemplated that there may be a determination of complementary or lack of commonality, not necessarily the same/similar user information that may create a micro-environment. For example, an accountant, a lawyer, a business owner, and a consumer may be part of micro-environment 101 based on their complementary roles.

It is contemplated that the assisted micro-environment system may often communicate through mobile devices that are associated with a user, but it is also contemplated that a user may be communicated to via audio, displays, or lighting that is not part of the mobile devices. In addition, it is contemplated that user information as disclosed here may be information received from sensors integrated into a mobile device of user and information gathered from sensors not connected with a mobile device of the user. The user information may be historical information that is received from a sensor, real-time information received from a sensor, data about the user inputted by an authorized party, or the like. Information (e.g., characteristics) about the environment or micro-environment as well as user information may be used to determine the micro-environment or managing one or more interactions associated with the micro-environment.

The disclosed subject matter allows for a dynamic alteration of micro-environments. Based on the disclosed use of micro-environments, venues, for example, may dynamically alter the experience of users and dynamically charge for accommodating such experience on a minute-by-minute basis or experience-by-experience basis.

Figure 3:
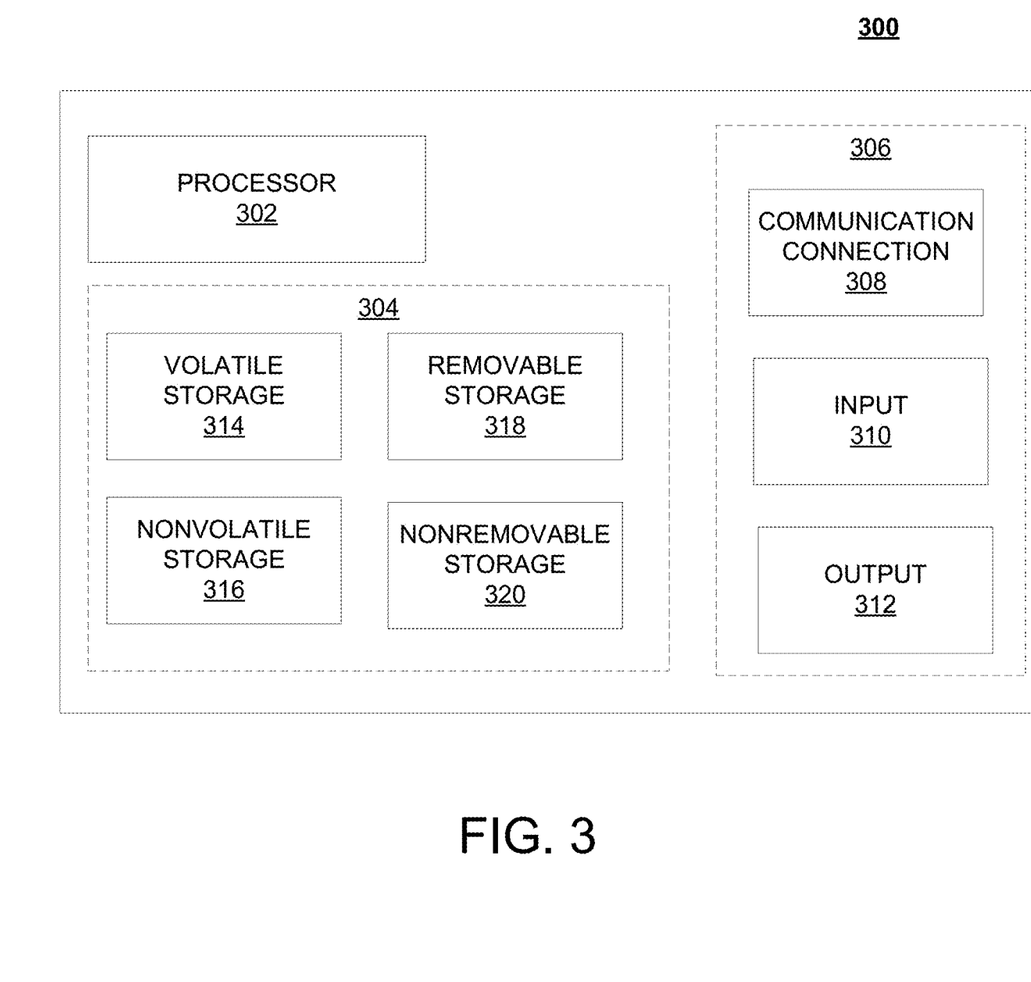
FIG. 3 illustrates a schematic of an exemplary network device.

FIG. 3 is a block diagram of network device 300 that may be connected to or comprise a device of FIG. 1. Network device 300 may comprise hardware or a combination of hardware and software. The functionality to facilitate telecommunications via a telecommunications network may reside in one or combination of network devices 300.

Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
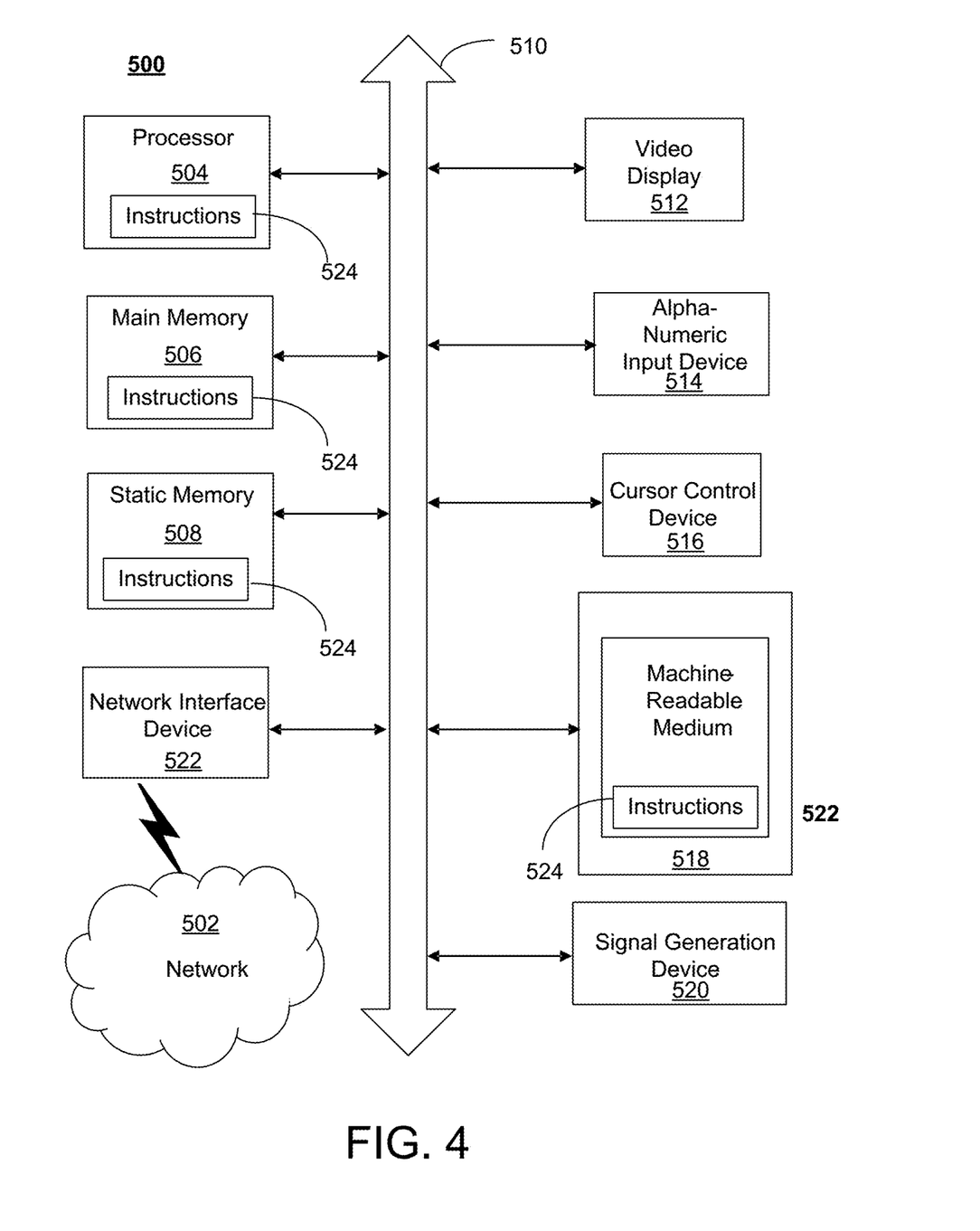
FIG. 4 illustrates an exemplary communication system that provides wireless telecommunication services over wireless communication networks.

FIG. 4 depicts an exemplary diagrammatic representation of a machine in the form of a computer system 500 within which a set of instructions, when executed, may cause the machine to perform any one or more of the methods described herein. One or more instances of the machine can operate, for example, as processor 302, mobile device 106, mobile device 115, MEE 109, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a disclosed system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which assisted micro-environment interactions can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—assisted micro-environment system—as illustrated in the Figures, specific terminology is employed for the sake of clarity. The claimed subject matter, however, is not intended to be limited to the specific terminology so selected, and it is to be understood that each specific element includes all technical equivalents. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples (e.g., skipping steps, combining steps, or adding steps between exemplary methods) are contemplated herein.

Methods, systems, and apparatuses, among other things, as described herein may provide for means for managing or operating an assisted micro-environment. A method, system, computer readable storage medium, or apparatus may provide for detecting a first mobile device in proximity to a first environment; based on the detecting of the first mobile device in proximity to the first environment, obtaining a profile associated with the first mobile device; based on the profile associated with first mobile device, obtaining first user information associated with a first user of the mobile device; comparing the first user information associated with the user of the first mobile device with respective user information associated with each of a plurality of users of mobile devices in proximity to the first environment; based on the comparing, determining a threshold confidence level is reached; and based on reaching the threshold confidence level, managing one or more interactions associated with a micro-environment of the first environment. The first user information may include demographic information, noise preference of the first user, temperature preference of the first user, temperature of the micro-environment, detected spoken language of the first user, or the like. The managing of one or more interactions may include altering virtual boundaries of the micro-environment, assigning the first mobile device to the micro-environment, sending instructions for the first user to proceed to the location of the micro-environment, or the like. A method, system, computer readable storage medium, or apparatus may provide for detecting a first mobile device; based on the detecting of the first mobile device, obtaining information associated with a user associated with the first mobile device; detecting a second mobile device in proximity to the first mobile device; based on the detecting of the second mobile device in proximity to the first mobile device, obtaining information associated with a second user associated with the second mobile device; comparing the user information associated with the first user of the first mobile device with user information associated with the second user of the second mobile device; and based on the comparing, defining virtual boundaries of a micro-environment, wherein the first mobile device and the second mobile device are located within the micro-environment. The first user information may include light level or coloration preferred by the user. The first user information may include light level or coloration detected proximate (e.g., within 5 feet of user) to the user. All combinations in this paragraph (including the removal or addition of steps) are contemplated in a manner that is consistent with the other portions of the detailed description.

What is claimed:

1. An apparatus comprising:
a processing system including a processor; and
a memory coupled with the processing system, the memory storing executable instructions that when executed by the processor cause the processor to effectuate operations comprising:
detecting a plurality of mobile devices, wherein the plurality of mobile devices are within a first micro-environment at a venue, wherein the plurality of mobile devices comprise a first mobile device and a second mobile device, wherein the second mobile device is in proximity to the first mobile device;
obtaining first information associated with a first user associated with the first mobile device;
obtaining second information associated with a second user associated with the second mobile device;
setting a threshold confidence level for measuring similarities between the first information and the second information;
comparing the first information associated with the first user of the first mobile device with the second information associated with the second user of the second mobile device;
in response to the comparing, determining, with a determined confidence level, that a subset of the first information associated with the first user of the first mobile device is similar to a subset of the second information associated with the second user of the second mobile device;
in response to determining that the determined confidence level exceeds the threshold confidence level, defining virtual boundaries of a second micro-environment within the venue; and
sending a first alert to the first mobile device and the second mobile device, the first alert comprising an assignment to the second micro-environment within the venue, instructions to proceed to the second micro-environment that includes navigational instructions to the second micro-environment, and a graphical display of the first micro-environment that indicates a current location of the first mobile device and the second mobile device, and the second micro-environment.

2. The apparatus of claim 1, the operations further comprising based on the first information and the second information, sending a second alert to adjust an aspect of an environment of the second micro-environment, wherein the aspect of the environment comprises climate control within the second micro-environment.

3. The apparatus of claim 1, wherein the first information comprises line-of-sight data of the first user.

4. The apparatus of claim 1, wherein the first information comprises common behavior characteristics of the first user and the second user.

5. The apparatus of claim 1, wherein the first information comprises common behavior characteristics of the first user and the second user, wherein the behavior characteristics of the first user and the second user comprise language.

6. The apparatus of claim 1, the operations further comprising based on the second micro-environment, providing, to the first mobile device, a recommendation on a topic to avoid for the first user or the second user in the second micro-environment.

7. The apparatus of claim 1, wherein the first information comprises temperature preference of the first user.

8. The apparatus of claim 1, wherein the first information comprises shivering of the first user and the second user.

9. A non-transitory, computer readable storage medium storing computer executable instructions that when executed by a computing device including a processor cause said computing device to effectuate operations comprising:
detecting a plurality of mobile devices, wherein the plurality of mobile devices are within a first micro-environment at a venue, wherein the plurality of mobile devices comprise a first mobile device and a second mobile device, wherein the second mobile device is in proximity to the first mobile device;
obtaining first information associated with a first user associated with the first mobile device;
obtaining second information associated with a second user associated with the second mobile device;
setting a threshold confidence level for measuring similarities between the first information and the second information;
comparing the first information associated with the first user of the first mobile device with the second information associated with the second user of the second mobile device;
in response to the comparing, determining, with a determined confidence level, that a subset of the first information associated with the first user of the first mobile device is similar to a subset of the second information associated with the second user of the second mobile device;

in response to determining that the determined confidence level exceeds the threshold confidence level, defining virtual boundaries of a second micro-environment within the venue; and sending a first alert to the first mobile device and the second mobile device, the first alert comprising an assignment to the second micro-environment within the venue, instructions to proceed to the second micro-environment that includes navigational instructions to the second micro-environment, and a graphical display of the first micro-environment that indicates a current location of the first mobile device and the second mobile device, and the second micro-environment.

10. The non-transitory, computer readable storage medium of claim 9, the operations further comprising based on the first information and the second information, sending a second alert to adjust an aspect of an environment of the second micro-environment, wherein the aspect of the environment comprises climate control within the second micro-environment.

11. The non-transitory, computer readable storage medium of claim 10, wherein the aspect of the environment comprises music.

12. The non-transitory, computer readable storage medium of claim 9, wherein the first information comprises line-of-sight data of the first user.

13. The non-transitory, computer readable storage medium of claim 9, wherein the first information comprises common behavior characteristics of the first user and the second user.

14. The non-transitory, computer readable storage medium of claim 9, the operations further comprising based on the second micro-environment, providing, to the first mobile device, a recommendation on a topic to avoid for the first user or the second user in the second micro-environment.

15. The non-transitory, computer readable storage medium of claim 9, wherein the first information comprises light level or coloration preferred by the first user and based on the first information comprising the light level or the coloration preferred by the first user, sending a third alert to adjust an aspect of an environment of the second micro-environment that includes the light level or the coloration preferred by the first user.

16. A system comprising:
a first mobile device located at a venue; and
a server communicatively connected with the first mobile device;
a processing system including a processor; and
a memory coupled with the processing system, the memory storing executable instructions that when executed by the processor cause the processor to effectuate operations comprising:
obtaining first information associated with a first user associated with the first mobile device in a first micro-environment;
obtaining second information associated with a second user associated with a second mobile device located at the venue in the first micro-environment;
setting a threshold confidence level for measuring similarities between the first information and the second information;
comparing the first information associated with the first user of the first mobile device with the second information associated with the second user of the second mobile device;
in response to the comparing, determining, with a determined confidence level, that a subset of the first information associated with the first user of the first mobile device is similar to a subset of the second information associated with the second user of the second mobile device;
in response to determining that the determined confidence level exceeds the threshold confidence level, defining virtual boundaries of a second micro-environment; and
sending a first alert to the first mobile device and the second mobile device, the first alert comprising an assignment to the second micro-environment, instructions to proceed to the second micro-environment that includes navigational instructions to the second micro-environment, and a graphical display of the first micro-environment that indicates a current location of the first mobile device and the second mobile device, and the second micro-environment.

17. The system of claim 16, the operations further comprising based on the first information and the second information, sending a second alert to adjust an aspect of an environment of the second micro-environment, wherein the aspect of the environment comprises lighting.

18. The system of claim 16, wherein the first information comprises line-of-sight data of the first user.

19. The system of claim 16, wherein the first information comprises common profile or behavior characteristics of the first user and the second user.

20. The system of claim 16, the operations further comprising based on the first information and the second information, sending a third alert to adjust an aspect of an environment of the second micro-environment, wherein the aspect of the environment comprises music.

* * * * *